(No Model.) 2 Sheets—Sheet 1.

F. R. SMITH.
Plaiting Machine.

No. 239,277. Patented March 22, 1881.

WITNESSES:
E. Laass
Wm. C. Raymond.

INVENTOR:
Franklin R. Smith
per Duell, Laass & Hey
Attorneys (No Model.) 2 Sheets—Sheet 2.
F. R. SMITH.
Plaiting Machine.
No. 239,277. Patented March 22, 1881.
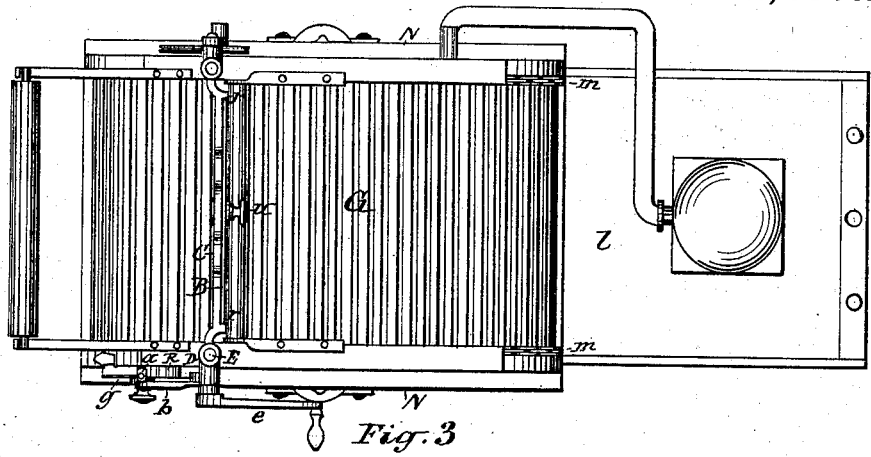
Fig. 3
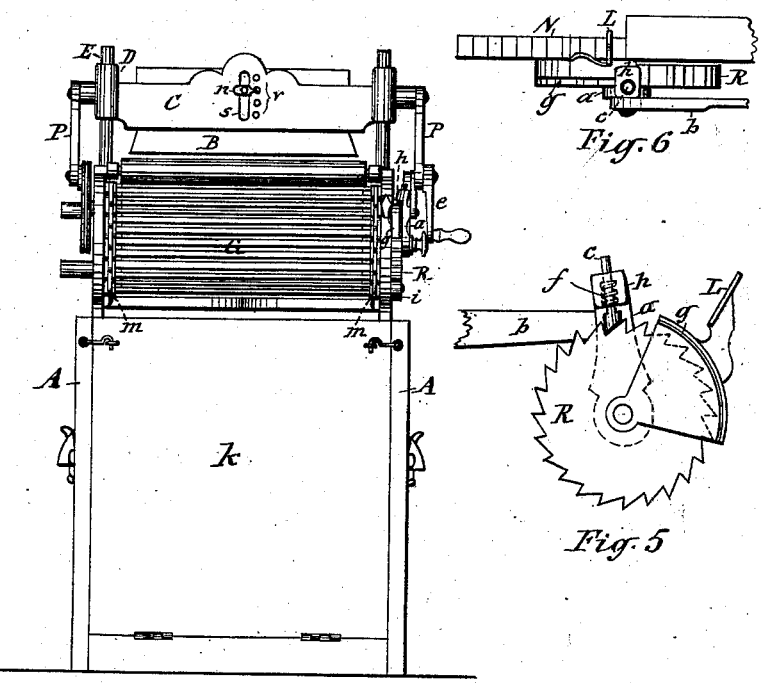
Fig. 4
Fig. 6
Fig. 5
WITNESSES: INVENTOR:
E. Laass Franklin R. Smith
Wm C. Raymond per Duell, Laass & Hey
Attorneys

United States Patent Office.

FRANKLIN R. SMITH, OF SYRACUSE, NEW YORK, ASSIGNOR TO WILLIAM DUFFUS, OF SAME PLACE.

PLAITING-MACHINE.

SPECIFICATION forming part of Letters Patent No. 239,277, dated March 22, 1881.

Application filed September 18, 1880. (No model.)

*To all whom it may concern:*

Be it known that I, FRANKLIN R. SMITH, of Syracuse, in the county of Onondaga, in the State of New York, have invented new and useful Improvements in Plaiting-Machines, of which the following, taken in connection with the accompanying drawings, is a full, clear, and exact description.

This invention has reference to that class of plaiting-machines in which a continuous or endless grate passes under and receives through its interstices a vertically-reciprocating plaiting-knife.

The invention consists in certain peculiarities in the details of construction of the machine and various devices connected therewith, as hereinafter fully described, and specifically set forth in the claims, whereby the machine is rendered more durable and more convenient and efficient in its operation.

Figure 1:
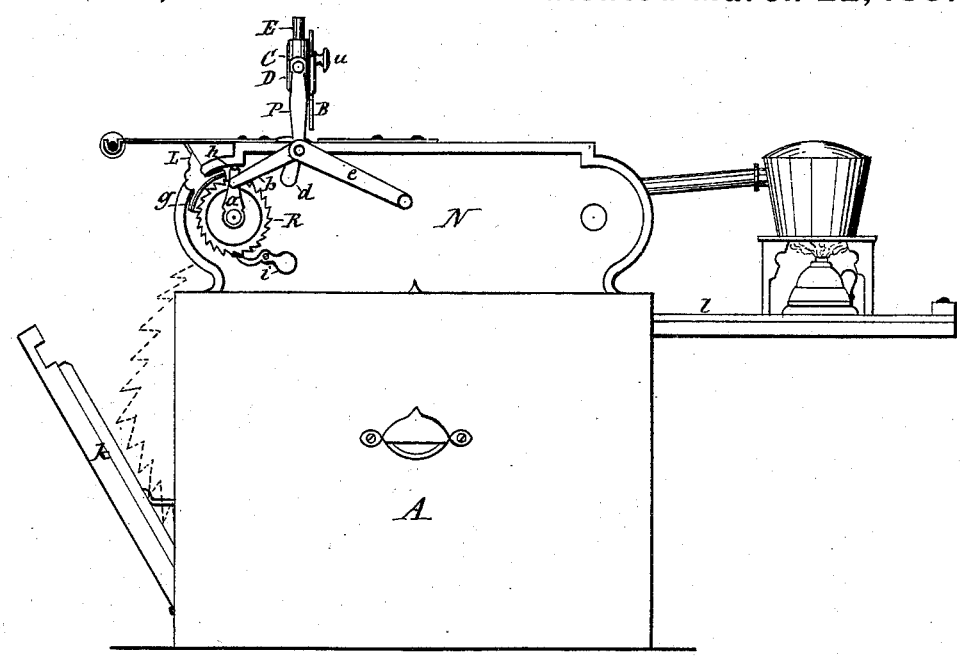
Figure 2:
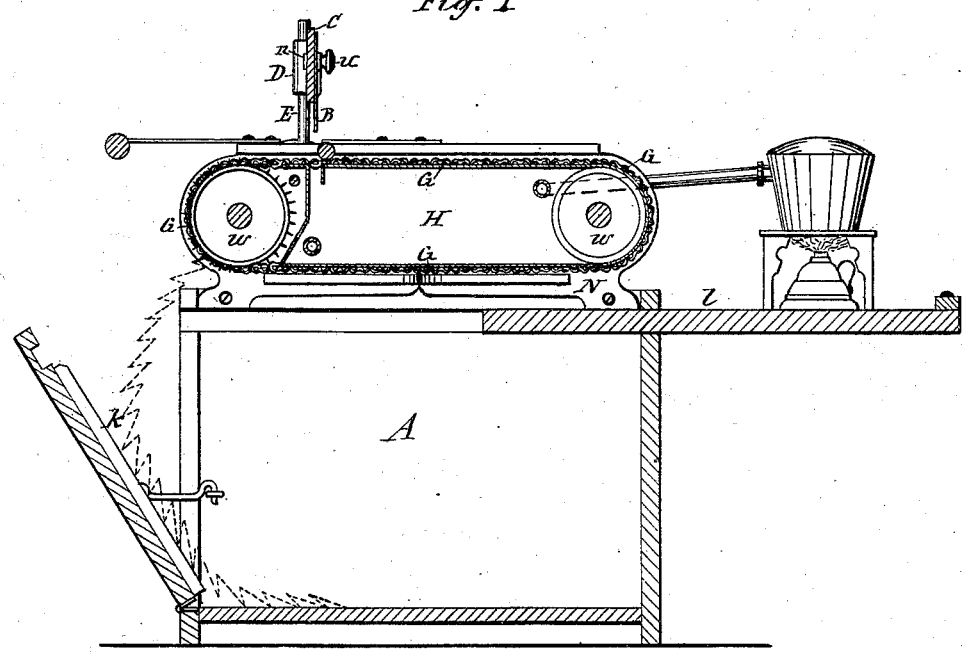

The invention is clearly illustrated in the accompanying drawings, wherein Figure 1 is a side elevation of my improved plaiting-machine; Fig. 2 a longitudinal section, Fig. 3 a top view, and Fig. 4 a front-end view of same. Fig. 5 is an enlarged rear view of the feed mechanism detached, and Fig. 6, a top view of the same.

Similar letters of reference indicate corresponding parts.

G denotes the endless plaiting-grate, formed of parallel and equidistant bars secured at their ends to endless chains *m m*, which pass around and are carried by wheels *w*, pivoted to opposite ends of a frame, N. The shaft of wheels *w*, at the front end of the machine, protrudes through the frame N, and has rigidly secured to its outer end a ratchet-wheel, R. To the axial center of this ratchet-wheel is hinged a radial arm, *a*, which extends past the periphery of the ratchet-wheel, and is provided at its extremity with a socketed or tubular head, *h*, in which slides a dog or pawl, *c*, in form of a stud, having a shank sliding in the socket of the head *h*, and backed by a spring, *f*, which forces said stud toward the ratchet-face of the wheel R. The arm *a* is, by means of a link, *b*, connected with a crank, *d*, which is pivoted near the plaiting-knife B, and of shorter stroke than the part of the arm *a* from its axial connection to its connection with the link *b*, so that the rotation of the crank will produce an oscillating motion on said arm. To the crank *d* is also connected a pitman, P, which at its opposite end is connected with the knife-carrier C, consisting of a plate extended across the top of the machine, and having on its ends sleeves D, sliding on vertical guide-rods E, secured to the frame N. By means of a hand-crank, *e*, applied to the wrist of the crank *d* the latter is rotated, and by its before-described connections with the arm *a* and with the knife-carrier imparts a reciprocal motion to said parts. The axis of the crank *d* is in such position relative to its connection with said arm and knife-carrier that simultaneously with the downward movement of the knife-carrier the arm *a* is swung to carry its pawl *c* out of the ratchet-teeth of the wheel R, and thus leave the grate stationary during the descent of the plaiting-knife, and conversely with the ascent of the knife-carrier the reverse movement of the arm causes its pawl to engage the ratchet-teeth of the wheel R, and by the connection of said wheel with the wheel *w* moves the grate G under the elevated knife. A dog, *i*, arranged in the usual manner, restrains the retrograde movement of the ratchet-wheel.

To the axis of the ratchet-wheel is hinged a sectoral plate, having a peripheral flange in the form of a segmental plate, *g*, covering a portion of the ratchet-wheel in front of the pawl *c*. The pawl *c*, being beveled toward the plate *g*, is caused to slide upon said plate, and thus prevented from engaging the ratchet-teeth of the wheel R during the reverse movement of the arm *a*. Thus it will be observed that the shield *g* can be set to cause the pawl to skip any number of ratchet-teeth and allow it to move the wheel R any desired distance, according to motion required of the grate, the latter gaging the width of the plaits to be formed in the cloth under treatment. A graduated scale on the end of the frame N, and a handle, L, on the plate *g*, serving as an indicator, greatly facilitates the regulating of the aforesaid movement.

B represents the plaiting-knife, consisting of a thin steel plate, which is adjustably secured to its carrier C by means of a set-screw, u, having its threaded shank passing through the knife and through a vertical slot, s, in the carrier, and provided at the opposite side of the latter with a nut, n, in the form of a pointer or indicator, as shown in Fig. 4 of the drawings, the face of the carrier being marked with a scale, v, indicating the distance between the bottom edge of the knife and lower edge of the carrier, or the depth which the knife penetrates the grate, the slot s in the carrier allowing the knife to be set higher or lower, according to the depth of the plaiting desired. The knife is sustained laterally and maintained in a horizontal position by vertical ribs r on the carrier abutting against the ends of the knife.

H denotes a steam-chamber extended from a point forward of the knife to the rear end of the grate, and of a height to bring it to bear against the inverted side of the grate at the top and bottom of the machine, and made semi-cylindrical at the rear end, to also bear on the grate thereat. Directly under the knife B the chamber H is provided with a slot for the entrance of said knife, so as to allow the cloth carried with said knife to come in contact with and become moistened by the steam in said chamber. The surface of the steam-chamber, being extended along the top, end, and bottom of the machine and in close proximity to the cloth, effectually presses and dries the plaits by the time they are carried around by the grate to the front end of the machine, where they are removed from the grate. One or more rollers pivoted to the frame N, and bearing on the grate in the same manner, as shown in another application for Letters Patent recently filed, apply the requisite pressure upon the top of the grate.

A represents a case composed of wood or other suitable material, and formed with a bottom and two vertical sides, to the top of the latter of which is secured the frame N of the plaiting-machine. At the front end of the machine the case A has a door, k, hinged to the bottom thereof, which door, when partly opened, as shown in Figs. 1 and 2 of the drawings, serves to collect the plaited cloth, as indicated by dotted lines, and convey the same into the case for protection.

Near the top of the case A is a horizontal slide, l, which can be drawn out at the rear end of the case and made to serve as a stand for a lamp and a kettle or steaming-vessel, as shown in the aforesaid figures of the drawings, the steam from said vessel being conveyed to the steam-chamber H by a hose or pipe.

Having thus fully described my invention, what I claim as new, and desire to secure by Letters Patent, is—

1. In combination with the endless grate G and its carrier w, the ratchet-wheel R, radial arm a, provided with the yielding pawl c, link b, crank d, and hand-crank e, as described and shown.

2. In combination with the ratchet-wheel R, the oscillating radial arm a, provided with the tubular head h, beveled sliding pawl c, and spring f, and the adjustable shield g, substantially as and for the purpose set forth.

3. In combination with the endless grate G and its carrier w, the ratchet-wheel R, radial arm a, provided with the yielding pawl c, link b, crank d, hand-crank e, and the pitman P, connected with the knife-carrier C, substantially as described and shown.

4. The combination, with the endless grate G and reciprocating knife B, of the ratchet-wheel R, radial oscillating arm a, provided with the yielding pawl c, the adjustable shield g, dog i, link b, crank d, hand-crank e, and pitman P, substantially in the manner shown and described.

5. The within-described adjustable feed mechanism, consisting, essentially, of a ratchet-wheel connected with the device, which moves the article to be operated on, an oscillating arm pivoted to the axis of the ratchet-wheel and provided with a yielding pawl adapted to engage the ratchet-teeth of said wheel, a segmental plate arranged movably over the aforesaid ratchet-teeth in front of the yielding pawl, and a dog arranged to prevent the retrograde movement of the ratchet-wheel, substantially in the manner described and shown.

6. The combination of the knife-carrier C, provided with the vertical ribs r, vertical slot s, and scale v, the knife B, sustained endwise between the ribs r and the set-screw u, provided with the nut n, in the form of a pointer or indicator, all substantially as described and shown.

7. The combination, with the endless grate G, of the steam-chamber H, extended from a point forward of the knife to the rear end of the grate, and bearing with its bottom, top, and rear end against the inverted part of the bottom portion, top portion, and rear-end portions of the grate, respectively, and provided with an entrance for the knife, substantially in the manner described and shown.

8. The combination, with a plaiting-machine, of the case A, having the door k, hinged to the bottom thereof, as described and shown, for the purpose set forth.

9. The combination, with a plaiting-machine provided with a steaming apparatus, of the case A, provided with the slide l and the door k, hinged to the bottom of said case, substantially as and for the purpose set forth.

In testimony whereof I have hereunto signed my name and affixed my seal, in the presence of two attesting witnesses, at Syracuse, in the county of Onondaga and State of New York, this 16th day of August, 1880.

FRANKLIN R. SMITH. [L. S.]

Witnesses:
E. LAASS,
WM. C. RAYMOND.